(No Model.)
A. KRONENBITTER.
DIE AND PUNCH FOR MAKING CLIPS FOR HEADS OF CARRIAGE SPRINGS.
No. 322,544. Patented July 21, 1885.
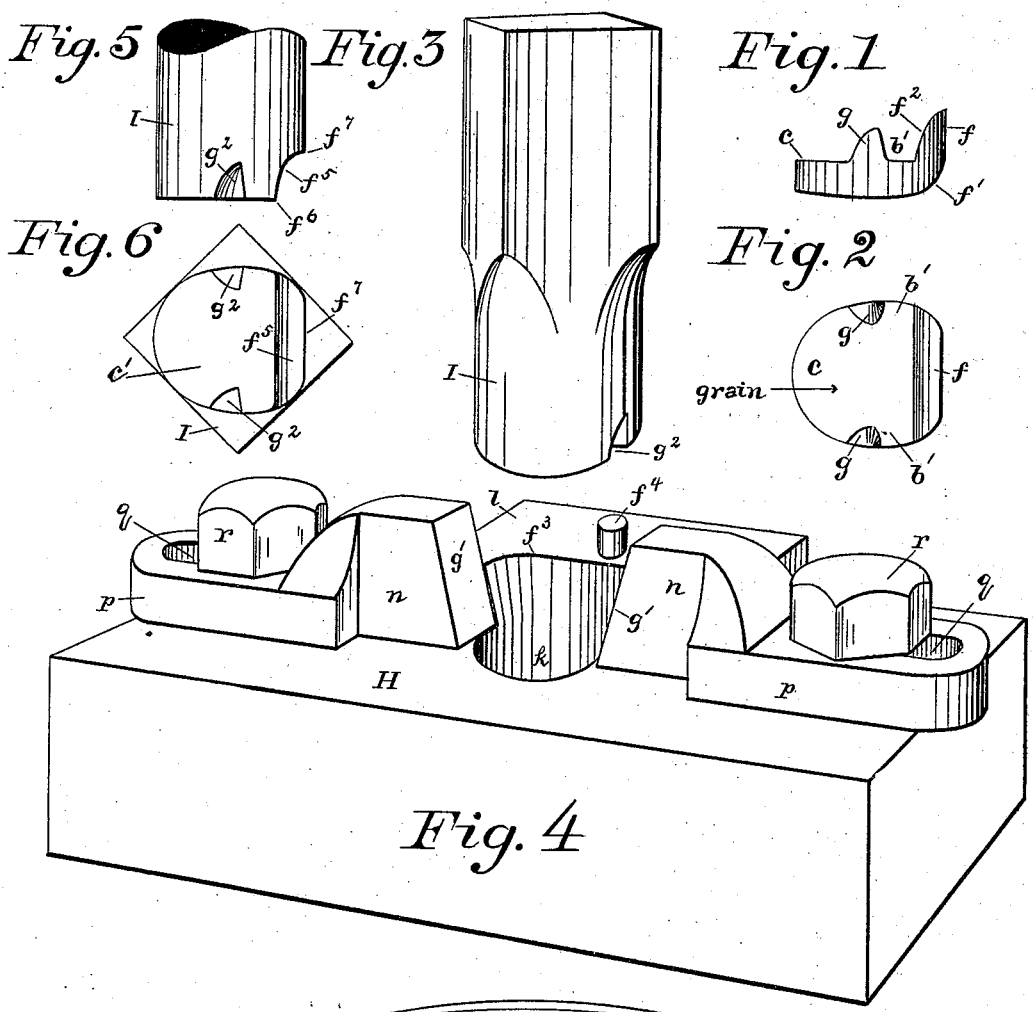
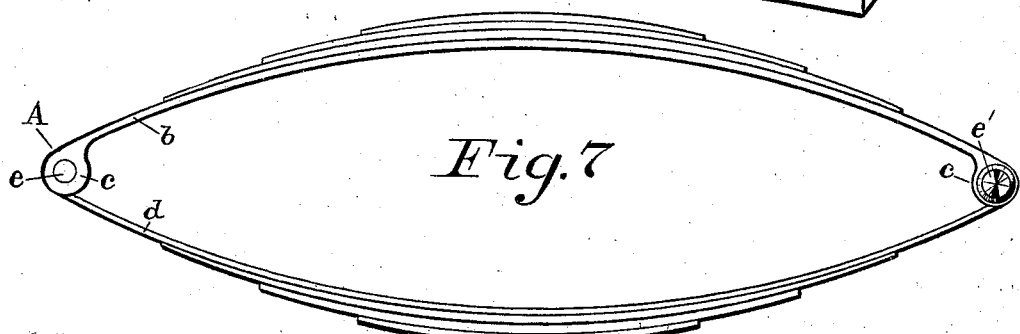
WITNESSES:
Edward A. Osse,
John E. Morris.
INVENTOR:
Anthony Kronenbitter
By Chas B. Mann
Attorney.
N. PETERS, Photo-Lithographer, Washington, D. C.

United States Patent Office.

ANTHONY KRONENBITTER, OF COSHOCTON, OHIO, ASSIGNOR OF NINE-TWENTIETHS TO FERDINAND HORN, OF SAME PLACE.

DIE AND PUNCH FOR MAKING CLIPS FOR HEADS OF CARRIAGE-SP SPRINGS.

SPECIFICATION forming part of Letters Patent No. 322,544, dated July 21, 1885.

Application filed June 20, 1884. (No model.)

*To all whom it may concern:*

Be it known that I, ANTHONY KRONENBITTER, a citizen of the United States, residing at Coshocton, in the county of Coshocton and State of Ohio, have invented certain new and useful Improvements in Dies and Punches for Making Clips Used in Forming the Heads of Carriage-Springs, of which the following is a specification.

My invention relates to a die and punch for making clips employed in forming the heads of carriage-springs.

The invention is illustrated in the accompanying drawings, in which Figures 1 and 2 are views of the clip. Fig. 3 is a view of the punch. Fig. 4 is a view of the die. Figs. 5 and 6 show side and face views, respectively, of the punch. Fig. 7 is a view of a carriage-spring, the heads of which are made from the improved clip. Fig. 8 is a top view of one end of the spring, showing the head.

The finished head A of a spring is shown in Figs. 7 and 8. An ordinary elliptic spring has two heads. One head is formed on each end of the inner plate, $b$, of one half of the spring, and consists of two clips or ear-pieces, $c$—one at each edge of the plate. Each end of the inner plate, $d$, of the other half of the spring is suitably formed to take position between the two clips, and a hole, $e$, is in each clip for the passage of the bolt $e'$, which secures the two halves of the spring together.

The object of my invention is to provide a better clip than any heretofore known for the formation of the heads.

The improved clip is shown in Figs. 1 and 2.

The letter $c$ designates the ear part of the clip, which has a flange, $f$, bent at a portion of the edge forward on the inner face. On the outer face a curve, $f'$, is formed, whereat the said flange is bent, and the inner face, $f^2$, of the flange has a rounded taper or bevel. This flange is to lap over the outer surface of the spring-plate $b$, and be welded thereto. A feature in the formation of this flange is that the grain of the iron is continuous across the ear part $c$, curve $f'$, and flange, whereby the liability of the said flange splitting off or separating from the ear part, as in clips heretofore used, is obviated. This result is obtained by first preparing straight bars or plates of iron flat on both surfaces, with the grain running straight one way, preferably lengthwise of the bar, and then presenting the bar to the die in such manner that the parts of the die which cut and bend the flange $f$ will take effect crosswise of the grain. Near each end of the flange is a tang, $g$, also bent at the edge of the ear forward on the inner face. The two tangs are diametrically opposite each other. Between each tang and the flange is a space, $b'$, which is to be occupied by the edge of the spring-plate $b$ when the welding is done. The tangs serve to keep the clip in position on the edge of the spring-plate while the flange $f$ is being welded. When in the welding process the initial union has been effected between the flange $f$ and spring-plate, the welding may then be easily completed and the union made thoroughly homogeneous, as there is nothing projecting from the inner face of the ear-piece but the two little tangs, which are so slight as not to interfere with the operation.

As will be seen hereinafter, the tangs on the inner face are formed of metal pressed from the full thickness of the bar.

The letter H designates the die-block, and I the punch. An opening, $k$, having the shape of the finished clip, is in the center of the block, through which the clip passes when cut by the punch. Fixed on the top of the block, at one side of the opening, is a raised ledge, $l$, having a top edge, $f^3$, which curves nearly half-way around the opening. On the surface of the ledge, just back of the edge $f^3$, is a stud, $f^4$. When the bar of iron from which the clip is to be cut is placed with its end against the stud $f^4$, and the punch I begins to descend on the bar, the edge $f^3$ bends the end of the bar up to form the clip-flange $f$. Then the punch continuing to descend cuts the clip.

At opposite sides of the opening $k$, and in front of the raised ledge $l$, are guides $n$, which set directly on top of the block H. The guides have beveled upright sides $g'$, which adjoin the opening. The bar of iron from which the clip is to be cut should be broader than the opening $k$, and when the bar is placed with its end against the stud $f^4$, it will set between the beveled sides $g'$, with its edges against said sides.

The end or face $c'$ of the punch is flat. Extending across one side of the punch and adjoining the face is a curved hollow or bevel, $f^5$, which in the operation of cutting the clip receives the inner bevel, $f^2$, of the flange. The said flange bends up over the lower edge, $f^6$, and is cut by the upper edge, $f^7$, on the side of the punch. Two notches, $g^2$, are in the edge of the face, one opposite the other. When the punch descends, each notch passes adjacent to one of the beveled sides $g'$ of the guides. The tangs $g$ on the clip are formed by these notches. When the punch descends on the bar of iron, the two guides will retain it in position, and as the punch crushes or cuts through the said bar the beveled sides of the guides will force the iron into notches $g^2$ of the punch, and thereby form the tangs $g$. It will be understood from the foregoing that the clip is cut and pressed into form at one descent of the punch I.

The guides $n$ are adjustable toward and away from each other. Each guide has a shank, $p$, with a slot, $q$, in it, and a set-screw, $r$, passes through the slot into the top of the block. By this means the guides may be adjusted.

A clip of the kind here shown and described is suited for heads of carriage and wagon springs of various kinds.

Having described my invention, I claim and desire to secure by Letters Patent of the United States—

1. A die for cutting and forming clips for heads of springs, consisting of a die-block, H, having an opening, $k$, a raised ledge, $l$, at one side of the opening, and a punch, I, having a curved hollow or bevel, $f^5$, extending across the side and adjoining the face, and provided in the edge with two notches, $g^2$, one opposite the other, as set forth.

2. A die for cutting and forming clips for heads of springs, consisting of a die-block, H, having an opening, $k$, a raised ledge, $l$, at one side of the opening, and in front of the ledge two guides adjoining the opening and opposite each other, each guide having a beveled side, $g'$, and a punch, I, having a curved hollow or bevel, $f^5$, extending across the side and adjoining the face, and provided in the edge with two notches, $g^2$, one opposite the other, as set forth.

In testimony whereof I affix my signature in presence of two witnesses.

ANTHONY KRONENBITTER.

Witnesses:
ROBERT LENMON,
J. H. ASKRENS.